Figure 1:
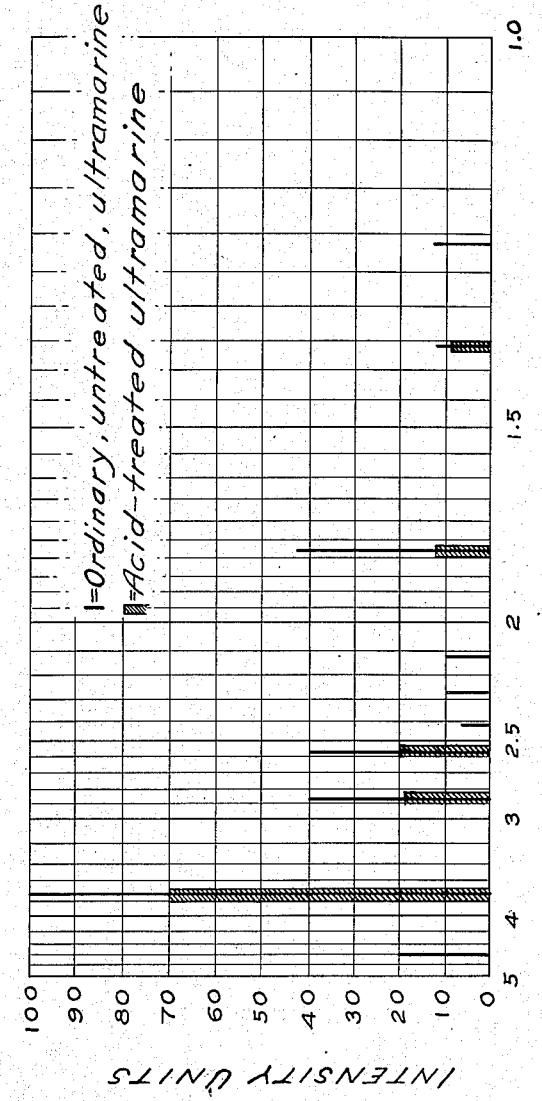

Feb. 17, 1953

F. J. SCHWAHL 2,628,920

ACID-RESISTANT ULTRAMARINE PIGMENT AND
PROCESS FOR THE PREPARATION THEREOF

Filed Nov. 21, 1950

3 Sheets-Sheet 1

INVENTOR
FREDERICK J. SCHWAHL,
BY
Evans Kahn
ATTORNEY

Feb. 17, 1953  F. J. SCHWAHL  2,628,920
ACID-RESISTANT ULTRAMARINE PIGMENT AND
PROCESS FOR THE PREPARATION THEREOF
Filed Nov. 21, 1950  3 Sheets-Sheet 2

INVENTOR
FREDERICK J. SCHWAHL,
BY
ATTORNEY

Feb. 17, 1953

F. J. SCHWAHL 2,628,920

ACID-RESISTANT ULTRAMARINE PIGMENT AND
PROCESS FOR THE PREPARATION THEREOF

Filed Nov. 21, 1950

3 Sheets-Sheet 3

INVENTOR
FREDERICK J. SCHWAHL,
BY
ATTORNEY

UNITED STATES PATENT OFFICE 2,628,920

ACID-RESISTANT ULTRAMARINE PIGMENT AND PROCESS FOR THE PREPARATION THEREOF

Frederick J. Schwahl, Hillside, N. J., assignor to American Cyanamid Company, New York, N. Y., a corporation of Maine Application November 21, 1950, Serial No. 196,742

14 Claims. (Cl. 106—305)

1

This invention relates to a novel, highly acid-resistant ultramarine pigment and to the preparation thereof. More specifically, this invention relates to a novel ultramarine of altered surface character, and to methods of producing the same. More specifically still, this invention relates to ultramarine, the particles of which have been reacted with a very dilute solution of a strong acid, treated with a solution of an alkali metal silicate, and then calcined, and to the process therefor set forth below.

It has long been recognized that the clarity and brilliance of ultramarine blue is rapidly and seriously affected by weak acids, even by such extremely weak acids as are normally present in industrial or city atmospheres. Inasmuch as ultramarine is generally applied for the purposes of effecting a permanent and not a fugitive coloration, the marked fading which occurs when ultramarine is weathered in such atmospheres for periods as short as six months is considered a rapid one. Another marked disadvantage inherent in ultramarine is that ultramarine pigments do not chalk blue from weathered paint films, but chalk a whitened shade which greatly reduces the intensity of the blue color of the underlying film.

Attempts have been made to improve the weather or the dilute acid resistance of ultramarine. One such step consisted in the envelopment of the individual particles of ultramarine with a coating of sodium silicate. This was done by slurrying ultramarine with dilute sodium silicate and drying the product. When this was done, only a slight improvement was effected, as the silicate coating proved permeable to the acids, and the sensitivity of the underlying ultramarine to acid attack had not been altered. Further attempts to improve the silicate coating were made on the one hand by the application of chemicals which served to harden the silicate coating, and on the other by calcination of the silicate-coated ultramarine on roofing granules. Such attempts also failed to produce an ultramarine exhibiting satisfactory weather resistance.

Attempts to provide ultramarine particles with a sufficiently durable coating having failed, effort was turned towards altering the characteristics of the ultramarine crystal lattice itself. The surprising discovery was then made that ultramarine possessed some of the properties of an artificial zeolite, and that, when ultramarine was reacted with a predetermined proportion of a very dilute solution of sulfuric acid, an ultramarine was obtained which had lost only very little of its original color and brilliance. This discovery was most

2 surprising, since it had been believed that an acid treatment of this type would cause the same bleaching which the dilute acids of city atmospheres were known to effect. It was further found that this acid reaction removed sodium from the ultramarine and formed a surface of a totally different character, in that the degree of crystallinity of the surface was drastically reduced as determined by its ability to diffract electron beams.

This acid-treated ultramarine was found to be chemically active in that it reacted readily in an aqueous solution of sodium silicate at an elevated temperature to form an ultramarine which contained about the same proportion of sodium and somewhat more silica than was contained in the original ultramarine. By this silication reaction, the acid resistance of the ultramarine was markedly enhanced.

The further surprising discovery was made that calcination of the above-described, acid-treated, silicated ultramarine under controlled conditions and to a controlled extent produced a product of extraordinary acid resistance, whereas calcination of a silicated ultramarine which has not been acid-treated does not.

Calcination of ultramarine usually dulls its brilliance somewhat and alters its shade. The further surprising discovery has been made that when the acid-treated, silicated, calcined ultramarine of this invention is cooled in a steam atmosphere, any dulling in brilliance that has occurred during calcination is restored and in some instances the resulting product is even more brilliant than it was before calcination. The process of the present invention does not require that the calcined ultramarine be cooled in a steam atmosphere, but this constitutes a part of the preferred embodiment of the invention.

The novel acid-treated, silicated, calcined ultramarine of the present invention can be used as a pigment for the principal applications in which ultramarine has been employed in the past: for the "whitening" of paper, in the laundering of clothes, in the formulation of paints and lacquers, for the coloration of natural and synthetic rubbers, for the pigmentation of synthetic plastics, for the printing of wall paper, and for the tinting of roofing granules. It is astonishingly more weather- and acid-resistant than any of the ultramarine pigments known in the past and is the best ultramarine pigment known for this last mentioned application. Moreover, this pigment exhibits the new property of chalking as a blue pigment from weathered paint films. All other previously known ultramarine pigments chalk a dirty whitish color from similar films.

Figure 2:
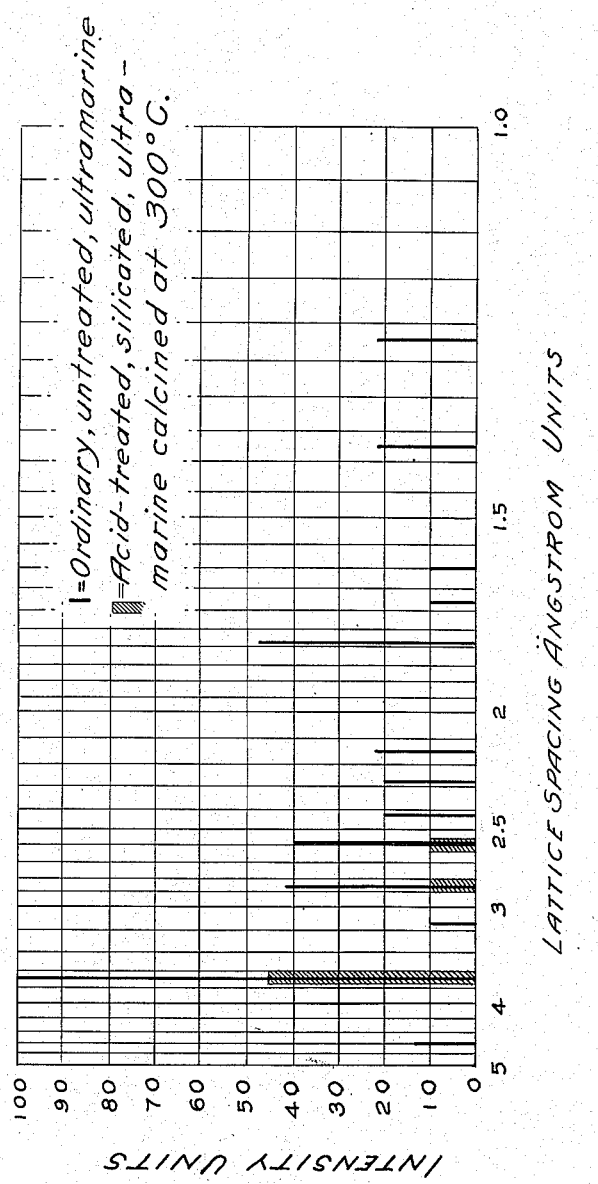
Figure 3:
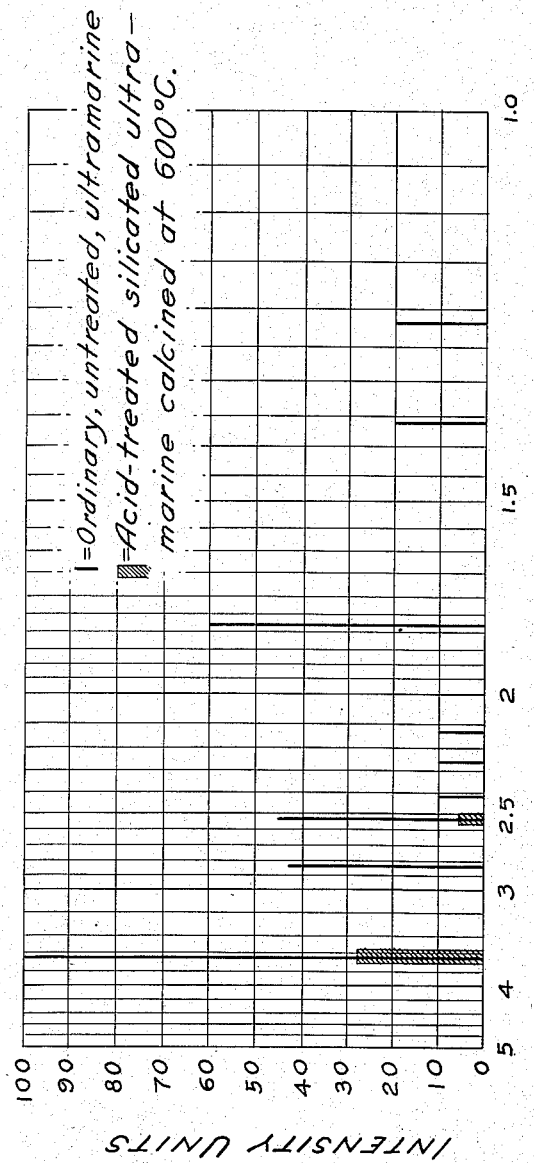

The product of the present invention will be further described with reference to the drawings, in which:

Fig. 1 shows a plot of the electron diffraction pattern of a sample of ordinary ultramarine (Plot 1–A), and superimposed thereon with cross-hatched lines a plot of the electron diffraction pattern of a sample of this ultramarine which has been acid-treated according to the process of the present invention for this step (Plot 1–B);

Fig. 2 shows a plot of the electron diffraction pattern of a sample of ordinary ultramarine (Plot 2–A), and superimposed thereon with cross-hatched lines a plot of the electron diffraction pattern of a sample of this ultramarine which has been acid-treated, silicated, and calcined at 300° C. for four hours according to the process of the present invention for these steps (Plot 2–B); and Fig. 3 shows a plot of the electron diffraction pattern of a sample of ordinary ultramarine (Plot 3–A), and superimposed thereon with cross-hatched lines a plot of the electron diffraction pattern of a sample of this ultramarine which has been acid-treated, silicated, and calcined at 600° C. for one hour according to the process of the present invention for these steps (Plot 3–B).

The electron diffraction pattern of ordinary ultramarine is not materially changed when the ultramarine is only slurried with the same dilute solution of sodium silicate as is employed in the instant invention and dried, or when the thus treated ultramarine is calcined. In other words, neither of these two treatments, alone or in sequence, causes any material decrease in the total surface crystallinity of the ultramarine particle.

In the drawings, the lines of the plots of the treated ultramarines (Plots 1–B, 2–B, and 3–B) are shown somewhat wider than the lines of the plots of the ordinary ultramarine (Plots 1–A, 2–A, and 3–A). These differences in width are only to facilitate visual comparison of the pairs of plots, and do not represent the respective widths of the rings as they appeared on the photographic plates.

The acid treatments, silications, and calcinations referred to in the descriptions of the figures were all conducted in a uniform manner and according to the preferred embodiment of the invention as set forth below, except as to Plot 2–B of Fig. 2, where the lower calcination temperature was used.

In making the electron diffraction pattern photographs employed for the preparation of the above plots, a uniform procedure was followed. In each instance an electron potential of 60 k. v. was applied, the same electron diffraction instrument was used, the samples were mounted in the same manner, and the exposure times were two seconds each, so as to yield the best photographs under the same conditions. The photographs were produced by the reflection method in pairs on glass plates, the pattern of ordinary ultramarine being produced on a different portion of the same photographic plate. Thereafter, the plates were developed and evaluated in precisely the same way.

With the reflection method of diffraction, the depth of vertical penetration is only about 100 Å., so that the resulting photographs report only the condition of the surface.

The three resulting plates were of conventional general appearance, and bore portions of the concentric diffraction rings, the blackest rings on the plates being those hereinafter referred to as the most intense.

In determining the relative intensity of each of the rings appearing in each pair of photographs, the intensity of the most intense ring of the pattern of ordinary ultramarine appearing on each plate was taken as the standard of comparison for the entire plate. This line was assigned the arbitrary value of 100 intensity units. The remaining rings on the plate were assigned numerical values proportional to their respective intensities thereto, e. g. a ring having 30 intensity units had an intensity which was 30% of the intensity of the standard line.

The relative intensities referred to above were determined by visual comparisons. In the case of the most intense rings, the accuracy of these visual comparisons were checked by, and agreed well with, densitometer readings. The densitometer, however, proved too insensitive for the determination of the relative intensities of the majority of the rings, and visual comparisons were necessarily employed in these instances.

On the photographic plates, the rings corresponding to lattice spacings below 1.5 Å. were not sharp rings, but were greatly broadened and blurred. They were so indistinct that they appeared to be at or near the limit of sensitivity of the electron diffraction camera's photographic plate. Rings of this extreme faintness, and even rings having an intensity of about 10% or even 15% of the brightest line of ordinary ultramarine or less, could not always be detected. The combined experimental error among the several observers varied from less than 10 density units in the case of the most intense rings to a maximum of about 15 intensity units for the faintest lines below 1.5 Å.

Instances of experimental error in the production of Figs. 1–3 may be observed first by comparing Plot 2–A with Plot 3–A. The same ultramarine was used in the preparation of these two plots, and the electron diffraction pattern photographs of this material were prepared and evaluated in the same way. Yet four of the weakest lines appearing in the photographic plate from which Plot 2–A was made were not detected by a majority of the observers who examined the photographic plate from which Plot 3–A was derived. Here the experimental error most probably was a human one, minor in extent.

Additional minor errors may also be caused by variations in the ultramarine. The ordinary ultramarine of commerce is a surprisingly well-standardized product considering the complex high temperature reactions which are necessary for its synthesis and the number of subsequent treatments such as grinding, classification and flotation to which it is subjected. The variation which may be expected from the standpoint of the apparent degree of surface crystallinity of these products is illustrated by Plots 1–A and 2–A. For the preparation of these plots two different ultramarines were employed. These two ultramarines were prepared by the usual commercial process, but were obtained from different production batches. The same type of minor variation is found between the two resulting plots as is found between Plots 2–A and 3–A, which were obtained from the same ultramarine.

The effect of experimental error was minimized first by photographing the patterns in pairs and thne by causing the patterns to be evaluated also in pairs, by the same group of observers, which permitted certain of these experimental errors to cancel out. The step of integration, described below, minimized the effect of the evaluators' failure or success in discerning the weakest lines.

The drawings show that the surface of ordinary, untreated commercial ultramarine is strongly crystalline. In each of the plots more than six diffraction rings were visible having intensities greater than 10% of the intensity of the dominant 3.70 Å. line, and a large number of additional rings having intensities 10% or less than the intensity of the dominant line were detected by a majority of the observers.

Comparison of Plots 1-A and 1-B of Fig. 1 demonstrates that the step of acid-treatment causes formation of an electron diffraction pattern indicative of an amazing decrease in the apparent surface crystallinity of the ultramarine, the new surface having only about one half of the apparent total crystallinity of the old. Only three of the strong lines of Plot 1-A persist as strong lines in Plot 1-B. Two lines of borderline intensity were discerned in the photographic plate from which Plot 1-B was prepared, and the remaining lines of ordinary ultramarine could not be detected at all.

Plot 2-B of Fig. 2 is the plot of the electron diffraction pattern of an ultramarine of the present invention, produced by calcining acid-treated, silicated ultramarine at 300° C. for four hours. The degree of total apparent surface crystallinity exhibited in this plot is only a fraction of that exhibited by Plot 1-B of Fig. 1.

Plot 3-B of Fig. 3 represents the pattern of a typical ultramarine prepared acoording to the preferred process of the present invention. This ultramarine corresponds exactly to the pigment used in the preparation of Plot 2-B of Fig. 2, except that the calcination was performed at 600° C. for one hour. Plot 3-B is substantially the same as Plot 2-B, the former, however, being less intense than the latter.

For optimum results the acid-treatment step should be performed so as to yield an ultramarine having about the total apparent surface crystallinity indicated by Plot 1-B of Fig. 1. Naturally, ultramarines having greater or less degrees of apparent surface crystallinity may also be prepared by varying the proportion of acid.

By the direct use of the plots, attainment of the initial and ultimate optimum total decrease of aparent surface crystallinity can be estimated. This decrease may be expressed by integration of the patterns in the following manner.

Turning first to Fig. 1, the intensity (length) of each of the lines of Plot 1-A thereof is determined on a unit scale and the values thus obtained are totaled to determine the total intensity of the pattern. This operation is hereinafter called the integration step. The result in this instance is about 29.5 intensity units. Integration of the lines of Plot 1-B on the same unit scale yields a value of about 12.8 intensity units. The total relative intensity of the electron diffraction pattern of the acid-treated material is therefore about 12.9 divided by 29.5 or about 44% of the intensity of the electron diffraction pattern of ordinary untreated ultramarine.

Turning next to Fig. 2, integration of the lines of Plot 2-A yields a value of about 39.6 intensity units. The corresponding value of the lines of Plot 2-B is about 6.4. The total relative intensity of the electron diffraction pattern of the material employed for the preparation of Plot 2-B with respect to the intensity of the pattern of ordinary ultramarine is therefore about 6.4 divided by 39.6 or about 16%.

A similar integration of the data of Fig. 3 demonstrates that the higher temperature of calcination yielded an ultramarine having a pattern, the total relative intensity of which is 3.3 divided by 31.7 or about 10%. In Plot 3-B the value of the line shown at 2.55 Å. is doubtful, and if this line be disregarded, the total apparent crystallinity then becomes about 9%.

The total relative intensities of these patterns is a measure of relative extent of the diffraction of the electron beam, the more intense patterns indicating a higher degree of total surface crystallinity. In establishing the relative intensities of the patterns, only the intensities of the discernible lines can be taken into account and the general appearance of the photographic plate with its background is disregarded. As stated, some observers are able to discern more or fewer of the weakest lines than other observers. When the comparisons are made under uniform conditions by the same groups of observers and averaged, remarkably consistent results are obtained and the effect of the ability or inability of the observers to detect these weakest lines tends to cancel out when the data of the plots are integrated and a ratio taken, as shown above.

Acid-treated, silicated and calcined ultramarines yielding comparative electron diffraction patterns having total intensities more than about 25% of the intensity of electron diffraction pattern of ordinary ultramarine are insufficiently acid-resistant for satisfactory use in roofing granules. Acid-treated, silicated and calcined ultramarine yielding patterns having total relative intensities of much less than 11% of the total intensity of the pattern of ordinary ultramarine can be prepared and usually have slightly superior acid-resistance but are weaker tinctorially, particularly in the case of ultramarines yielding patterns in the 6% range of total relative intensity.

It has further been found that the central portion of the ultramarine particle is not affected by the acid treatment, the silication step, or the calcination step, so far as has been determined. As pointed out above, electron diffraction pattern photographs disclose the condition of only the surface of the ultramarine particle to a depth of about 100 Å. They give no information as to the constitution of the interior of the particle. To obtain information on the latter point, X-ray diffraction patterns were made of ordinary ultramarine and of the several ultramarines used for the preparation of the intensity plots set forth in the drawings. The X-ray diffraction patterns thus obtained were substantially identical, all disclosing the strong, regular diffraction pattern characteristic of ordinary ultramarine.

The data set forth above demonstrate that a composite ultramarine pigment particle of the present invention comprises a particle of ultramarine having two zones substantially enveloped in a coating of an amorphous composition predominantly composed of silicon and oxygen as a dehydration product of hydrated silicic acids, said coating being substantially alkali metal free; one of said zones being a central zone of ordinary ultramarine and the second zone being a peripheral zone of an ultramarine of low apparent crystallinity. The nature of said peripheral zone and the nature of said coating is not precisely known, further than is disclosed herein, and applicant does not wish to be restricted to any particular formula or theory.

The complete process of the present invention, starting with the untreated ultramarine of commerce may be conducted as follows, the example being submitted only to illustrate a commercial embodiment of the invention and not by way of limitation thereon.

*Example*

Forty lb. of commercial untreated ultramarine (dry basis) are slurried with 67 lb. of water. In a separate vessel 2 lb. of 93% sulfuric acid are dissolved in 175 lb. of water. The ultramarine slurry is added to the acid solution, without stirring, through a hose extending below the surface of the acid at a temperature of about 20° C. The mixture is then stirred slowly. A substantially neutral or only slightly acid slurry of a highly flocculated ultramarine results within less than a minute. This is the acid-treatment step referred to above.

The mixture is then stirred and heated by the injection of steam to 90° C. until evolution of hydrogen sulfide substantially ceases and the pH of the solution becomes substantially neutral. At this temperature and during a period of 1.5 hours, there is added a solution of 17 lb. of sodium silicate in 33 lb. of water. The mixture is stirred for half an hour, and allowed to settle. The sodium silicate solution used has a specific gravity of 42 Baumé and a $Na_2O : SiO_2$ ratio of 1:3.22. It contains roughly 0.1 lb. of NaO and 0.3 lb. of $SiO_2$ per pound of liquid, and is inherently alkaline. Substantially all of this sodium silicate is consumed. This is the silication step referred to above.

The supernatant liquor is racked off, and the precipitate is reslurried in water, filtered, and dried at 70–90° C. When a filter press is used in this step it is advantageous to add enough aluminum sulfate, $Al_2(SO_4)_3 \cdot 18H_2O$, to the slurry to neutralize to brilliant yellow any remaining alkalinity. The silicated ultramarine thus prepared exhibits an alum and acid resistance far greater than that of the original ultramarine from which it was made.

The final step, which produces the most highly alum- and acid-resistant ultramarine known, is effected by calcination of the above-described acid-treated, silicated ultramarine. Commercially, this may be done in an indirectly fired clay calciner of the conventional rotating drum type containing spiral baffles. The rotation of the drum and the action of the baffles drives the charge slowly forward, the rate of rotation of the drum and the temperature of the furnace being regulated so that the ultramarine reaches a temperature of about 600° C. at the discharge end in slightly less than ½ hour, which is sufficiently quickly to prevent substantial deterioration of the brilliance of the ultramarine by oxidation, and is held at that temperature until evolution of water therefrom ceases, or about one minute. Steam is given off as the temperature of the blue rises and is vented through the end openings. Access of air is limited as far as possible.

The calcined ultramarine is cooled to about 100° C.–150° C. in a steam atmosphere, which results in the absorption of about as much water as was removed by the calcination, and also causes a pronounced brightening of the color of the pigment. When at room temperature, the ultramarine is screened to 99% through 325 mesh and packaged.

It is a surprising advantage of this invention that the above-mentioned screening can be readily performed, and that the formation of strong aggregates of "clinkers" does not occur during the calcination.

Variations from the above process are possible.

In the acid-treatment step described above, 5% of sulfuric acid was employed based on the weight of the ultramarine. This proportion removes sufficient sodium from the crystal lattice and has been found to give best results under most circumstances. Increasing the proportion of sulfuric acid above 7% causes a noticeable tinctorial degradation of the product. Less than 5% of acid may be used, but less than about 3% to 4% is disadvantageous in that such small percentages usually fail to remove sodium from the ultramarine to the extent found most desirable and fail to reduce the surface crystallinity to a sufficient extent.

The concentration of the acid in the initial resulting slurry is not critical and may be varied within wide limits. It is not particularly advantageous to have more water present than 4 to 6 times the weight of the ultramarine. When the total water is less than about 3 times the weight of ultramarine, stirring difficulties aries.

Sulfuric is the preferred acid. Less advantageously a chemically equivalent proportion of other strong mineral acid may also be employed, notably hydrochloric acid.

The method given above for combining the acid with ultramarine need not be followed exactly, but it is employed primarily so as to cause all the ultramarine to react quickly and uniformly with all the acid.

In the silication step, the sodium silicate solution is added after the ultramarine has been heated to a temperature well in excess of 50° C. and preferably at about 90° C. While the temperature of the slurry is being raised to the desired point the pigment reacts with the still slightly acidulated water to some slight extent, removing sulfur from the crystal lattice and releasing a very small amount of hydrogen sulfide from the solution. The hydrogen sulfide has the undesirable property of lowering the pH of the bath, and as the bulk of the sodium silicate solution should be present only under neutral or alkaline conditions, entry of the sodium silicate should be deferred until sufficient hydrogen sulfide has vaporized off and a substantially neutral slurry results. The sodium silicate is inherently alkaline and, therefore, may be added with the slurry very slightly on the acid side, but a substantial degree of acidity will cause precipitation of the silicate as a gel and will inhibit the desired reaction of the silicate with the ultramarine.

Enough sodium silicate should be added to substantially satisfy the absorptive capacity of the ultramarine for sodium ions. A slight excess over this amount is preferred. In the example a slight excess of sodium silicate was present. A larger excess may be used but the formation of a coating of sodium silicate should be avoided because it does not increase the acid resistance of the pigment and does decrease the tinctorial strength of the pigment. It is unnecessary to use more silicate than is necessary to cause the weight of $SiO_2$ in the amorphous coating of the final pigment to be more than about 10%–13% of the weight of the pigment, depending on the particle size of the pigment. Good pigments of lower SiO₂ content of the coating can be prepared, and the percentage may be as low as 6.8%.

The duration of the silication reaction is important and should last until satisfaction of the capacity of the ultramarine for sodium has been substantially attained. This rarely takes less than half an hour and a longer period, up to about two hours, often gives better results. The absorption of sodium ions into the ultramarine crystal causes the formation of compounds of silicon and oxygen of the type of silicic acid, or hydrated silica compounds, on the surface of the ultramarine. The compounds thus formed have a brief existence and decompose on the surface of the ultramarine particle to form an amorphous permeable coating predominantly composed of silicon and oxygen. It is very surprising that when the proportions of the example are followed, this coating is substantially free from sodium.

Other sodium silicates of similar composition ratio to that used in the example having a substantial excess of SiO₂ may be used. They may be replaced in whole or in part with similar solutions of potassium silicate. A similar product is obtained.

The temperature of the silication reaction is not critical, considerably better results being obtained at 90° C. in a shorter time than at room temperature.

At each calcination temperature the ultramarine rapidly attains a condition of stability, so that further heating at the same temperature causes no additional evolution of water and produces no significant increase in its acid resistance. This stability is attained at 300° C. or 350° C. in less than about one hour, while at 800° C. only a few seconds are required.

Accordingly, it is not necessary to employ the furnace described above. Any furnace which will permit ultramarine to be heated uniformly, steadily, and rapidly, to 600° C. or 800° C. with venting of steam is useful for this purpose. For example, a furnace of the horizontal stationary drum type containing a horizontal, rotatable spiral worm centering about a hollow shaft has also been satisfactorily employed. With a furnace of this design, heating gases are admitted through the central shaft of the worm, and the charge is driven forward by rotation of the worm. By the use of a flash calciner of conventional design operating at 600° C., the calcination referred to above is effected in much less than five minutes.

Batch calcination is also possible, and in fact this is the usual laboratory method. In a batch calcination, crucibles of ultramarine are inttroduced into a retort heated to 600° C., where they are allowed to remain for about one hour. It is advantageous to provide a substantially inert atmosphere over the ultramarine. The crucibles are cooled under humid conditions as described above.

In the calcination step, the presence of air should be avoided as far as practicable, and total exclusion is preferred. However, the presence of such amounts of air as normally diffuse into the furnace at the charging and discharge openings is not a serious disadvantage. The extent of the damage caused by the air is greater as the temperature is higher. The following description of the effect of temperature assumes that the small amount of air so difficult to exclude is present.

For good results it is only necessary to calcine the ultramarine above 350° C. until the silica coating, which acts as a continuous permeable membrane, is dehydrated and converted into a substantially and generally impermeable coating, that is, until evolution of water from the treated ultramarine ceases, or until further heating produces no substantial improvement in acid resistance. During this calcination fine cracks may develop throughout the coating, but this is not unduly harmful. The most economical temperature of calcination may be determined by subjecting the pigment to the acid test set forth below.

As a practical matter the improvement begins to be evident when the acid-treated, silicated ultramarine has been calcined at a temperature of about 300° C. or 350 C. The improvement in the alum resistance of the ultramarine becomes progressively greater as the temperature of calcination is raised, and in the range of 500° to 700° C., and particularly at 600° C., the improvement appears to reach its maximum. The highest temperature to which I have found it practical to heat the pigment is 800° C. However, there are disadvantages in the use of such a high temperature. The silicated ultramarine may not be heated above 800° C. more than momentarily, or it suffers serious loss of strength. If heated to 700° C. the maximum duration of exposure may be a little longer, but should not be much beyond five minutes, or a similar noticeable loss of strength occurs. If 600° C. is the highest temperature to which the ultramarine is exposed, it may be held at that temperature for about one hour without appreciable loss of strength. The temperature may be easily correlated with the duration of calcination by observing the appearance of the stream of ultramarine leaving the furnace. Any substantial alteration in the appearance of the ultramarine is evidence that the speed of rotation of the drum of the continuous calciner should be increased or that the temperature of the calciner should be moderated. These conditions should be controlled as necessary to compensate for such variables as the water content of such batch, particle size of the pigment, and amount of silicate used, and should be adjusted so as to cause the least harm.

Since the improvement in alum resistance effected by heating ultramarine to 600° C. is nearly as great as that obtained by heating to 700° or 800° C., and the danger of deterioration of the ultramarine is much less, it is preferred to regard 600° C., or preferably the zone from 500° to 700° C., as the optimum working temperature.

When the calcination is performed in a completely inert atmosphere, the damage is drastically reduced. When air is rigidly excluded, acid-treated, silicated ultramarine may be held at 600° C. for several hours without harm. Not only is there no damage to the product but it is darker, stronger, and more acid-resistant than a similar product obtained by heating the same starting material for one hour at 600° C. with limited access of air.

It may be remarked that silicating of the acid-treated ultramarine seems to confer on the blue a resistance to exposure to high temperatures in the presence of air which it would not otherwise have. Unsilicated ultramarine cannot be heated in air to 300° C. and particularly to 600° C. without a severe loss of quality, possibly for the reasons taught in copending application Serial No. 606,887, filed July 24, 1945, by Dr. A. P. Beardsley et al., now U. S. Patent 2,441,951. In part the improvement caused by the silicating step appears to be due to the protective silica coating, which prevents the harmful access of oxidizing gases such as air and furnace gases.

Any of the commercial ultramarine blue pigments may be successfully treated by the process. The particle size distribution of the ultramarine selected, however, is a matter of some interest, and ultramarines composed of a majority of coarse particles (i. e. particles larger than 2–3 microns) yield a pigment which has the greatest over-all usefulness and exhibits the highest alum resistance. However, the coarser ultramarines, as commonly obtained by commercial methods of particle size classification, are regularly the weaker ones tinctorially. But when the calcining process follows the acid treatment and silication processes, the surprising fact has been found that it is not necessary to segregate the coarse particles and use them by themselves. The mixture of coarse and fine particles obtained by the usual wet grinding can be silicated and calcined and the product possesses substantially the same degree of alum resistance as coarse particles treated in the same way. Since the highest tinctorial strength resides in the finer particles, this means that not only can a more alum-resistant blue be made by the calcining process, but a stronger blue at the same time.

In this specification and the claims that follow, the phrase "alum resistance" is used synonymously with "acid resistance" and "weather resistance" to designate the resistance of ultramarine to whitening in the presence of a boiling aqueous solution of aluminum sulfate, $$Al_2(SO_4)_3 \cdot 18H_2O$$

also known as papermakers' alum, herein called "alum." In evaluating the acid-treated, silicated, calcined ultramarine of this invention, it was obviously impractical to employ actual out-of-door weathering tests, which would have required at least several years for completion. It has long been known that "alum" solutions are especially deleterious to ultramarine and that they cause the same type of deterioration as do actual weathering tests. An "alum" solution is merely a convenient means of preparing a buffered solution of a given pH value. It is the pH value of an "alum" solution which determines the activity of its attack.

Such solutions have long been standard throughout the trade for testing the comparative acid resistance of different ultramarines because they afford a rapid, simple, reproducible and very drastic means for evaluating even the most highly acid-resistant ultramarines. Consequently, the alum test is used in the present work. The test as used herein is carried out as follows:

A solution is made by dissolving 100 g. of $Al_2(SO_4)_3 \cdot 18H_2O$ in water to a total volume of 1000 cc. One hundred cc. of this solution are put in a test-tube and 1.0 g. of the ultramarine to be tested is added. The test-tube is then immersed for 30 minutes in a boiling water bath. At the end of this period the sample is filtered off, washed free of acid, and dried. The loss in strength is arrived at by determining the strength of the untreated sample by visual comparison with a series of ultramarines of predetermined strength, determining the strength of the treated sample in the same manner, and recording the residual strength as a percentage of the original strength of the pigment.

Five tests were made illustrating the alum resistance of the ultramarines discussed above. In test No. 1 ordinary, commercial, untreated ultramarine was employed which corresponded to the ordinary ultramarine employed in the preparation of Figs. 1, 2, and 3. The next four tests were made on pigments prepared by subjecting respective portions of this ultramarine to one or more of the steps required by the process of the present invention.

In addition, two tests were made on pigments the preparation of which was discussed in Hanahan U. S. Patent 2,296,638. In the first test (test No. 6 below) a sample of the untreated ultramarine of test No. 1 was slurried first with sulfuric acid and then with sodium silicate according to the procedure of Example 1 of said Hanahan patent, as modified by the advice on page 3, column 2, lines 63–66 thereof.

The second test (test No. 7 below) was made on the material prepared for test No. 6 which had been heated to 300° C. for four hours.

| Test No. | Ultramarine Used | Appearance after Test | |
|---|---|---|---|
| | | Tinctorial Strength [1] | Color |
| 1 | Ordinary untreated ultramarine | Whitened within 5 min | |
| 2 | No. 1, acid-treated [2] | do | |
| 3 | No. 1, silicated [2] | do | |
| 4 | No. 1, acid-treated and silicated [2] | 12% | Very light grey-blue. |
| 5 | No. 1, acid-treated, silicated and calcined [2] | 48% | Deep blue. |
| 6 | No. 1, treated according to 1 of U. S. 2,296,638 as modified by p. 3, col. 2, lines 63–66 thereof. | Whitened within 5 min | |
| 7 | No. 6, calcined at 300° C. for one hour [2] | do | |

[1] Percent of strength of pigment before test.
[2] According to the procedure set forth under the example above.

Of the samples tested, those of tests Nos. 1, 2, 3, 6, and 7 bleached very rapidly in the hot alum solution and at the end of five minutes were all dirty white in color, when these tests were discontinued.

In test No. 4, at the end of thirty minutes the sample was light grey-blue in color and had about one-eighth of the tinctorial strength it had before the test.

The material tested in test No. 5 corresponded to the ordinary product manufactured on a commercial scale according to the process of the present invention. This simple, when subjected to the same drastic test, lost only about one-half of its strength and, therefore, was about four times as strong as the product of test No. 4. The product of test No. 5 was a deep strong blue and did not have the greyish appearance characteristic of the product of test No. 4

In the laboratory ultramarines have been prepared by the process of the present invention which have considerably better alum resistance than the commercial pigment used in test No. 5, and have residual strengths up to about 60%.

For practical out-door use, ultramarines which have residual tinctorial strength of about 25% are sufficiently acid resistant for such applications as paint pigments and chalk blue from these films after weathering. For use on roofing granules the ultramarine should be somewhat more acid resistant, and ultramarines having residual tinctorial values of about 40% are preferred.

These tests demonstrate the astonishing degree of alum resistance exhibited by the product of the present invention, and demonstrate further that the improvement effected by the combination of the process steps is greater than the sum of the improvements effected by the several steps taken singly.

This application is a continuation-in-part of my application Serial No. 3,902, filed January 23, 1948, now abandoned.

In the specification and the claims which follow, the word "ultramarine" is used to designate the ordinary ultramarine of commerce, a process for the preparation of which is described in U. S. Patent No. 2,441,952 to Alling P. Beardsley et al., granted May 25, 1948.

I claim:

1. As a new and useful composition of matter, pigment particles of an ultramarine substantially enveloped in a water-insoluble, substantially alkali-metal free, amorphous composition of dehydrated silicic acids, said particles displaying, when subjected to a beam of X-rays in an X-ray diffraction apparatus, the X-ray diffraction pattern characteristic of ordinary untreated ultramarine and also displaying, when subjected to a beam of electrons in an electron diffraction apparatus, the residue of the electron diffraction pattern of said ordinary ultramarine, said residual pattern having not more than about 25% of the intensity of the electron diffraction pattern displayed by said ordinary ultramarine under the same conditions; said pigment being further characterized in that when one part thereof is heated in 100 parts of a 10% solution of $Al_2SO_4 \cdot 18H_2O$ in water at 100° C. for 30 minutes, the residual tinctorial strength of the thus-heated ultramarine is more than about 25%.

2. A pigment according to claim 1, wherein the relative intensity of the residual pattern is about 6-25%.

3. A pigment according to claim 1, wherein the relative intensity of the residual pattern is about 14%.

4. A pigment according to claim 1, wherein said residual tinctorial strength is about 40%.

5. A pigment according to claim 1, wherein the relative intensity of the residual pattern is about 6%-25% and the residual tinctorial strength is about 40%.

6. A pigment according to claim 1, wherein the relative intensity of the residual pattern is about 14% and the residual tinctorial strength is about 40%.

7. Process for the preparation of an ultramarine of improved acid resistance which comprises (1) reacting ultramarine with a very dilute solution of a strong mineral acid to form an aqueous slurry of acid-treated ultramarine, the proportion of said mineral acid in said solution being the stoichiometrical equivalent of 2%-7% of sulfuric acid of the weight of said ultramarine; (2) heating said acid-treated ultramarine in aqueous medium to about 90 C. until evolution of hydrogen sulfide substantially ceases; (3) reacting the resulting ultramarine with an alkali metal silicate solution until the absorptive capacity of said ultramarine for alkali metal ions is substantially satisfied; (4) calcining said silicated ultramarine between about 350° C. and 800° C. until evolution of water from said silicated ultramarine substantially ceases; and (5) cooling said calcined ultramarine.

8. A process according to claim 7 wherein the mineral acid is sulfuric acid.

9. A process according to claim 8 wherein the proportion of sulfuric acid is about 5%.

10. A process according to claim 9 wherein the alkali metal silicate is a sodium silicate.

11. A process according to claim 10 wherein the ratio of $Na_2O$ and $SiO_2$ in said silicate is about 1:3.2.

12. A process according to claim 11 wherein the acid-treated ultramarine in aqueous medium is heated to not less than about 60° C.

13. A process according to claim 12 wherein the calcination temperature is about 500°-700° C.

14. A process according to claim 13 wherein said calcined ultramarine is slowly cooled in a humid atmosphere.

FREDERICK J. SCHWAHL.

REFERENCES CITED

The following references are of record in the file of this patent:

UNITED STATES PATENTS

| Number | Name | Date |
|---|---|---|
| 1,631,628 | Fisher | June 7, 1927 |
| 2,296,638 | Hanahan | Sept. 22, 1942 |
| 2,535,057 | Gessler | Dec. 26, 1950 |